Aug. 13, 1957     H. EPSTEIN ET AL     2,802,441
REVERSE TRAVEL SIGNALLING DEVICE FOR AUTOMOBILES
Filed March 22, 1955

INVENTORS.
Herman Epstein
James R. Pratt
BY
Hamilton & Hamilton
Attorneys.

2,802,441
Patented Aug. 13, 1957

2,802,441
REVERSE TRAVEL SIGNALLING DEVICE FOR AUTOMOBILES

Herman Epstein, Kansas City, and James R. Pratt, Independence, Mo.

Application March 22, 1955, Serial No. 495,899

8 Claims. (Cl. 116—35)

This invention relates to new and useful improvements in safety signalling devices for automobiles or other vehicles, and has particular reference to a signal for indicating that an automobile is in reverse gear and is backing up.

The principal object of the present invention is the provision of a signalling device of the class described which will be actuated automatically, entirely without the attention of the driver, whenever the automobile starts to travel in a reverse direction. The device, which by its nature is peculiarly adapted to provide an audible signal such as the ringing of a bell, is intended primarily for use in and around crowded parking areas, where the pedestrians are so numerous as to be difficult for the driver to watch them all with sufficient care, and where the pedestrians have great difficulty in seeing the ordinary reverse travel signal lights in use on some automobiles.

Another object is the provision of a signalling device of the character described which is entirely self-contained, requiring no outside electric, hydraulic or other power connections, and which, despite the fact that it contains several relatively movable parts, requires only a single, rigid structural connection to the automobile structure. Generally, the motive power is provided by the relative movement between certain parts which revolve with a wheel of the automobile and other parts which are restrained against rotation by a pendulum-type weight.

Other objects are extreme simplicity and economy of construction, efficiency and dependability of operation and adaptability to be mounted behind a hub cap of any ordinary automobile, in which position it is well protected against damage from blows, and against dust, dirt and grease.

With these objects in view, as well as other objects which will appear in the course of the specification, reference will be had to the drawing, wherein.

Figure 1:
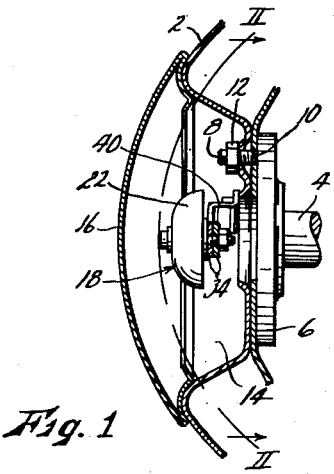
Fig. 1 is a fragmentary, diametric sectional view of the hub portion of an automobile wheel, with parts left in elevation, showing a signal device embodying the present invention mounted therein.
Figure 2:
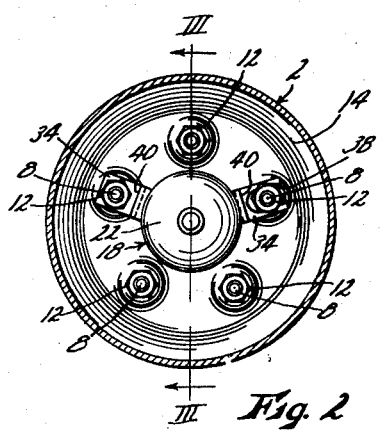
Fig. 2 is a somewhat irregular sectional view taken on line II—II of Fig. 1.
Figure 3:
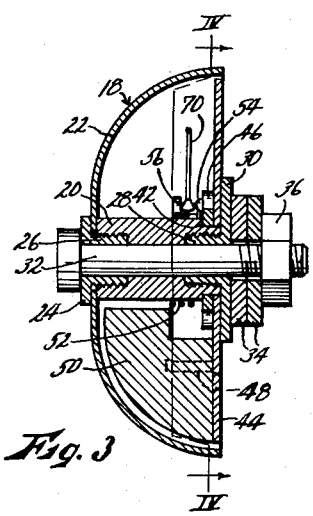
Fig. 3 is an enlarged, fragmentary sectional view taken on line III—III of Fig. 2.

Like reference numerals apply to similar parts throughout the several views, and the numeral 2 applies to the hub portion of an automobile wheel. The axle 4 of the automobile is provided at its end with a flange 6 having a plurality of bolt studs 8 affixed therein and disposed in a ring concentric with the axle. Said studs extend outwardly from flange 6 through holes 10 (Fig. 1) in hub 2, and have nuts 12 threaded on the outwardly extended portions thereof to hold the wheel firmly in position on the axle flange. The nuts 12 are usually disposed within a recess 14 of the hub, said recess normally being covered by a removable hub cap 16.

The signalling device forming the subject matter of this invention, which is indicated generally by the numeral 18, is mounted within the hub recess 14 and, as detailed in Figs. 3–6, includes a tubular spindle 20 disposed substantially coaxially with axle 4. To the outer end of said spindle is affixed a cup-shaped hollow bell 22, said bell being clamped between the end of the spindle and the flange 24 of a tubular screw 26 threaded into the end of the spindle. A similar tubular screw 28 is threaded into the opposite end of the spindle, and is provided with a radial flange 30. The signalling device is attached to the automobile wheel by a bolt 32 which passes through the spindle and the tubular screws, and through perforations provided therefor in a pair of strap metal arms 34, and has a nut 36 threaded on the extended end thereof whereby to clamp arms 34 tightly against flange 30. Arms 34 extend radially from bolt 32, one of said arms being perforated at its outer end to engage one of bolt studs 8 and to be clamped thereon by the corresponding nut 12, and the other of said arms being longitudinally slotted at its outer end, as indicated at 38, to engage another of studs 8. It is apparent that said arms permit the position of spindle 20 to be adjusted so as to be coaxial with axle 4. Arms 34 may also be offset intermediate their ends, as indicated at 40, so that signal device 18 will clear any projection of axle 4, or the axle bearings, into the hub recess 14.

Mounted rotatably on spindle 20, between flange 30 and a shoulder 42 formed on said spindle, are a circular carrier disc 44 and a ratchet wheel 46. Carrier disc 48, which engages flange 30, is disposed within the mouth of bell 22 and nearly closes said bell, although the edge of the disc must be spaced apart slightly from the lip of the bell to permit free vibration of said lip. Attached to disc 44 by screws 48 is a weight 50. Said weight is disposed eccentrically to spindle 20, and since it will normally hang downwardly by gravity, it serves to secure disc 44 against rotation as the spindle turns.

Ratchet wheel 46 is freely rotatable on the spindle between shoulder 42 and carrier disc 44. A uni-directional clutch interconnects wheel 46 with spindle 20, said clutch comprising a helical coil 52 of spring wire disposed about said spindle in frictional contact therewith. One end of said wire is free, while the other end thereof is soldered or otherwise rigidly connected to ratchet wheel 46, as indicated at 54. It will be apparent that when spindle 20 turns in the same direction that coil 52 is wound, considering the wire as proceeding from its point of attachment, it will tend to tighten the coil thereabout, causing the ratchet wheel to turn with the spindle. This direction represents reverse travel of the automobile, and is counter-clockwise as viewed in Fig. 4. When the spindle turns in the opposite direction, as when the vehicle is moving forwardly, it tends to unwind and loosen coil 52 thereon, so that no greater torque can be applied to ratchet wheel 46 than that caused by the initial tension of the coil.

Figure 4:
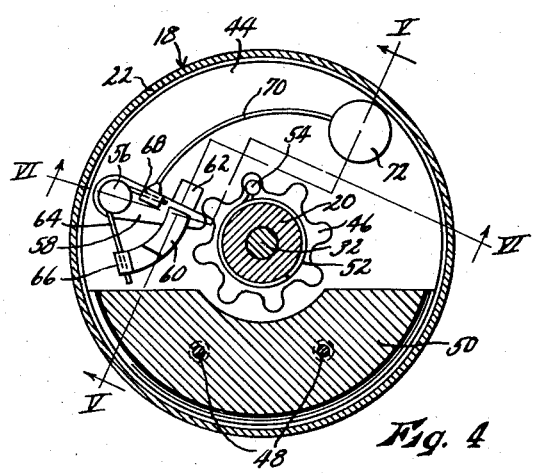
Fig. 4 is a sectional view taken on line IV—IV of Fig. 3.
Figure 5:
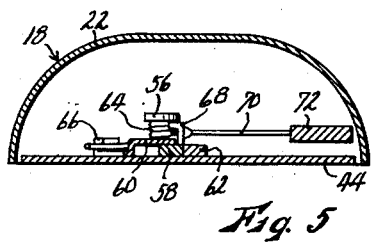
Figs. 5 and 6 are sectional views taken respectively on lines V—V and VI—VI of Fig. 4.
Figure 6:
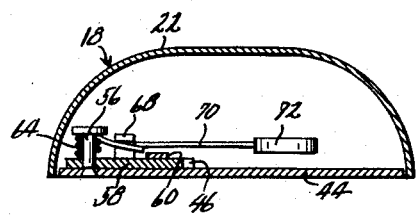

A pivot pin 56 is fixed in carrier disc 44 adjacent the edge thereof, and in spaced apart relation from ratchet wheel 46. A lever 58 is pivoted freely on said pin, and lies slidably against the surface of disc 44, being retained against said disc by a guide 60 carried by and fixed to said disc. Said lever normally extends toward ratchet wheel 46 substantially radially thereto, as shown in Fig. 4. Its pivotal movement in one direction is limited by a stop 62 fixed to disc 44. It is urged toward and against said stop by a spring 64 coiled about pin 56, the radially extending end portions of said spring engaging respectively a keeper 66 fixed to disc 44 and a post 68 fixed to lever 58. A spring wire arm 70 is fixed at one end to post 68, and has a clapper 72 affixed to the opposite end thereof. Said clapper is disposed in very slightly spaced relation from the rim of bell 22 when lever 58 is resting against stop 62, and moves still farther from the bell as lever 58 pivots away from the stop.

In operation, so long as the automobile moves forwardly, hence turning spindle 20 in a clockwise direction as viewed in Fig. 4, clutch coil 52 remains loose as previously described, and transmits only a very small torque to ratchet wheel 46 and thence to lever 58, urging said lever against stop 62. This torque is not sufficient to overcome the opposite torque of weight 50, and the clutch therefore slips. Whenever the automobile is reversed, it causes spindle 20 to turn in a counterclockwise direction, whereby clutch coil 52 is tightened thereon as previously described, thus causing lever 58 to be pivoted away from stop 62 against the pressure of spring 64. The force required to pivot the lever, which force is also transmitted through pin 56 to disc 44, must be less than the opposite torque exerted on said carrier disc by weight 50. As each tooth of the ratchet wheel passes under lever 58, the lever is snapped back against stop 62 by spring 64. The clapper 72 will continue to move outwardly by its inertia, flexing arm 70, until it strikes bell 22. The ringing will of course be continuous as long as the automobile continues to travel rearwardly.

While we have shown and described a specific embodiment of our invention, it will be apparent that many minor changes of structure and operation could be made without departing from the spirit of the invention as defined by the scope of the appended claims.

What we claim as new and desire to protect by Letters Patent is:

1. A reverse travel signalling device for automobiles comprising a spindle adapted to be fixedly attached to a wheel of an automobile substantially coaxially with the axis of rotation thereof, a bell mounted on said spindle, a carrier mounted rotatably on said spindle, a weight fixed to said carrier eccentrically of said spindle, said weight being normally positioned beneath said spindle by gravity whereby to prevent rotation of said carrier, a clapper mounted oscillatably on said carrier and operable when actuated to strike said bell, and an operative connection between said spindle and said clapper and actuated by the rotation of said spindle relative to said carrier, said connection being operable when said spindle is turned in one direction to actuate said clapper, and being inoperable when said spindle is turned in the opposite direction, the direction of rotation of said spindle producing actuation of said clapper corresponding to reverse travel of the automobile.

2. A reverse travel signalling device for automobiles comprising a spindle adapted to be fixedly attached to a wheel of an automobile substantially coaxially with the axis of rotation thereof, a bell mounted on said spindle, a carrier mounted rotatably on said spindle, a weight fixed to said carrier eccentrically of said spindle, said weight being normally positioned beneath said spindle by gravity whereby to prevent rotation of said carrier, a clapper mounted oscillatably on said carrier and operable when actuated to strike said bell, an actuator mounted rotatably on said spindle and operable when turned relative to said carrier to actuate said clapper, and a uni-directional clutch interconnecting said spindle and said actuator, said clutch being operable to turn said actuator when said spindle is turned in a direction corresponding to reverse travel of the automobile.

3. The structure as set forth in claim 2 wherein said spindle is cylindrical, and wherein said clutch comprises a helical coil of resilient wire positioned around said spindle in frictional contact therewith and having one end thereof affixed to said actuator.

4. A reverse travel signalling device for automobiles comprising a spindle adapted to befixedly attached to a wheel of an automobile substantially coaxially with the axis of rotation thereof, a bell mounted on said spindle, a carrier mounted rotatably on said spindle, a weight fixed to said carrier eccentrically of said spindle, said weight being normally positioned beneath said spindle by gravity whereby to prevent rotation of said carrier, a lever pivoted to said carrier on an axis parallel to and eccentric to said spindle, a clapper mounted on said lever and operable by oscillation of said lever to strike said bell, a stop on said carrier limiting the movement of said lever in one direction, a spring carried by said carrier and urging said lever against said stop, a toothed wheel mounted rotatably on said spindle, the free end of said lever engaging between a pair of the teeth of said wheel, and a frictional connection between said spindle and said toothed wheel, whereby as said spindle is turned in one direction it will transmit sufficient torque to said toothed wheel to pivot said lever against said spring, and whereby as said spindle is turned in the opposite direction the torque transmitted to said toothed wheel and thence through said lever and stop to said carrier, will not be sufficiently large to rotate said carrier.

5. A reverse travel signalling device for automobiles comprising a spindle adapted to be fixedly attached to a wheel of an automobile substantially coaxial therewith, a bell mounted on said spindle, a carrier mounted rotatably on said spindle, a weight fixed to said carrier eccentrically of said spindle, said weight being normally positioned beneath said spindle by gravity whereby to prevent rotation of said carrier, a lever pivoted to said carrier on an axis parallel to and eccentric to said spindle, a clapper mounted on said lever and operable by oscillation of said lever to strike said bell, a stop on said carrier limiting the movement of said lever in one direction, a spring carried by said carrier and urging said lever against said stop, a toothed wheel mounted rotatably on said spindle, the free end of said lever engaging between a pair of the teeth of said wheel, and a uni-directional clutch interconnecting said spindle and said toothed wheel, whereby said spindle will turn said wheel in a direction to move said lever away from said stop.

6. The structure as set forth in claim 5 wherein the parts are so proportioned and positioned that the rotative torque applied to said carrier by said spindle acting through said toothed wheel, said lever and said spring, as said lever is pivoted against said spring, is less than the opposite rotative torque applied to said carrier by said weight.

7. The structure as set forth in claim 5 wherein said spindle is cylindrical, and wherein said clutch comprises a helical coil of resilient wire positioned around said spindle in frictional contact therewith and having one end thereof fixed to said toothed wheel, said wire being wound around said spindle, starting from its attached end, in a direction corresponding to the direction said wheel must turn to urge said lever away from said stop.

8. The structure as set forth in claim 5 wherein said spindle is cylindrical, and wherein said clutch comprises a helical coil of resilient wire positioned around said spindle in frictional contact therewith and having one end thereof fixed to said toothed wheel, said wire being wound around said spindle, starting from its attached end, in a direction corresponding to the direction said wheel must turn to urge said lever away from said stop, the rotational torque exerted on said carrier by said spindle through said clutch, toothed wheel, lever and stop, as said lever is urged against said stop, being less than the opposite torque exerted on said carrier by said weight.

References Cited in the file of this patent

UNITED STATES PATENTS

| | | |
|---|---|---|
| 2,252,497 | Engel | Aug. 12, 1941 |
| 2,427,453 | Hadley | Sept. 16, 1947 |